(No Model.)

W. H. HART, Jr.
BICYCLE LOCK.

No. 505,522. Patented Sept. 26, 1893.

WITNESSES:

INVENTOR
William H. Hart Jr.
BY
ATTORNEY.

UNITED STATES PATENT OFFICE.

WILLIAM H. HART, JR., OF PHILADELPHIA, PENNSYLVANIA.

BICYCLE-LOCK.

SPECIFICATION forming part of Letters Patent No. 505,522, dated September 26, 1893.

Application filed November 10, 1892. Serial No. 451,495. (No model.)

*To all whom it may concern:*

Be it known that I, WILLIAM H. HART, Jr., a citizen of the United States, residing in the city and county of Philadelphia, State of Pennsylvania, have invented a new and useful Improvement in Bicycle-Locks, which improvement is fully set forth in the following specification and accompanying drawings.

My invention consists of a lock adapted to be connected with the treadle of a bicycle, and form a support or stand for the latter.

It also consists of means for suspending the lock from the bicycle, as will be hereinafter set forth.

Figure 1:
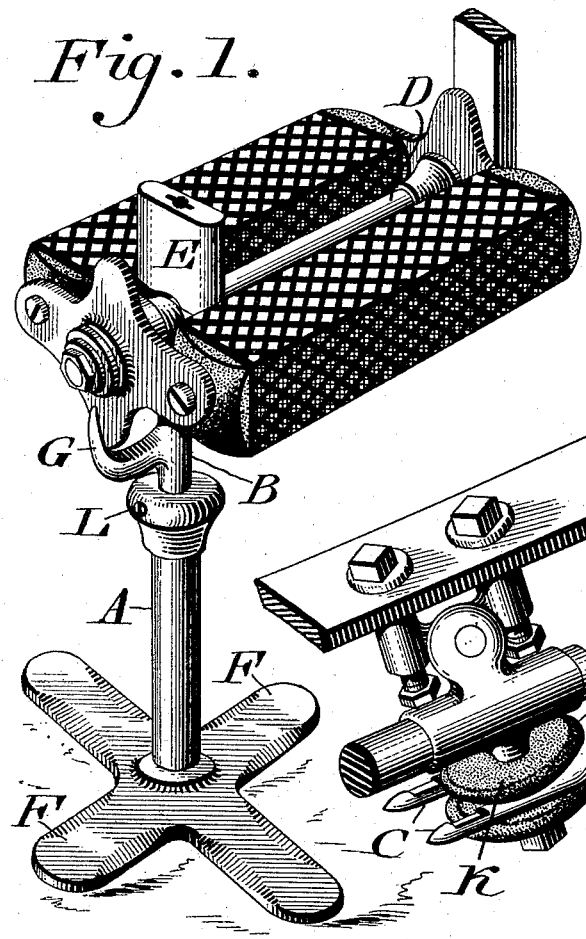
Figure 2:
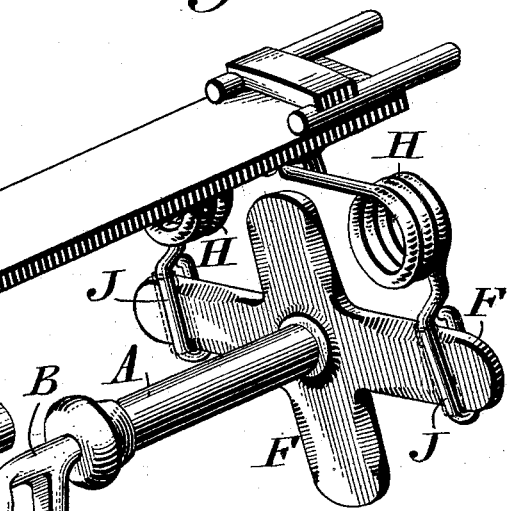
Figure 3:
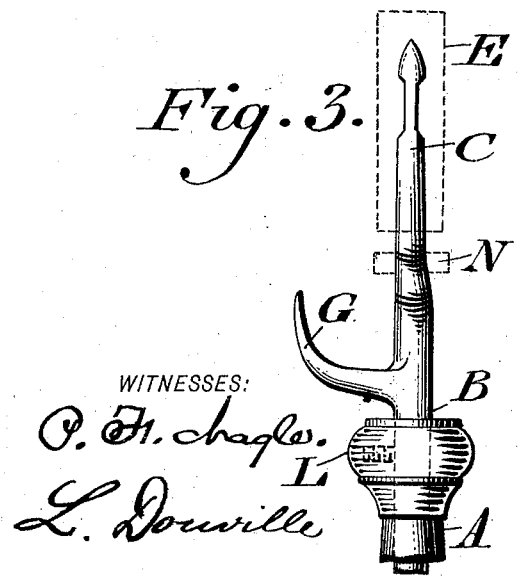
Figure 4:
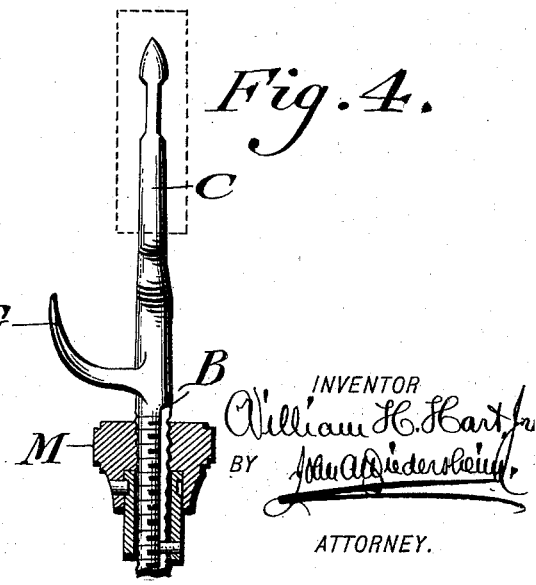

Figure 1 represents a perspective view of a bicycle lock embodying my invention. Fig. 2 represents a perspective view of the lock in inoperative position, on a bicycle. Fig. 3 represents a side elevation of a detached portion. Fig. 4 represents a partial side elevation and partial vertical section of a portion of a modification.

Similar letters of reference indicate corresponding parts in the several figures.

Referring to the drawings: A designates a standard to which is telescopically fitted the stem B, whose upper end has a bifurcation C thereon, the limbs of said bifurcation being adapted to embrace the axis D of the treadle of a bicycle, and enter the padlock E.

At the bottom of the standard A, is a base F, formed of arms projecting at an angle, said standard being somewhat of the form of a cross-shaped figure, whereby said base presents a broad surface for preventing overturning of the standard and connected parts.

On the side of the stem B, is a horn G, which is adapted to contact with one end of the treadle, and thus prevent shifting of the bifurcation C on the axis D, it being noticed that when the base rests on the ground, the bicycle may be sustained in upright position, owing to the connection of the stem B with the treadle thereof. Should attempts be made to work the treadle, the lock and connected parts will rotate with the same and the base may strike the ground, thus indicating that the bicycle has not the rightful occupant thereon.

When a proper key is applied to the lock, the latter may be withdrawn from the bifurcation C, or vice versa, and thus the treadle is free of the lock and stand formed by the parts with which the lock has been connected.

In order to carry the lock with a bicycle, the latter has a proper part of the same provided with elastic hangers H from which depend the loops J to receive opposite arms of the base F, and a grooved cushion K, to be embraced by the bifurcation C, as will be seen in Fig. 2, it being evident that the arms F may be readily disconnected from the loops J, and the bifurcation withdrawn from the cushion K, thus removing the device from the treadle. The bifurcation C forms the bow or shackle of a padlock, and it has notches or recesses to be engaged by the bolt thereof. The stem B which carries said bifurcation is adjustable in height owing to its telescopic connection with the standard A, the head of the latter being provided with a screw L which is adapted to tighten against said stem, and thus retain the bifurcation in its adjusted position.

In lieu of the screw L, I employ a swiveled nut M, which is mounted on the standard A, and engages with threads on the stem, whereby by rotating said nut, the stem, and consequently the bifurcation may be raised and lowered, and retained in its adjusted position.

While the part K is described as a cushion, it may be formed of any suitable material, such as felt, rubber, &c., but to this I do not limit myself, as any grooved block will answer the purpose so long as it may be embraced by the bifurcation C, and thus sustain an end of the device on the frame of the bicycle, while the end thereof is held in the loops J.

When the bicycle is supported by the stand, the treadle rests on the crotch or inverted crown formed by the bifurcation C, as the bow or shackle of the lock, but if the shackle is of the form of a single arm, a shoulder is formed on the same, as shown in dotted lines at N, Fig. 3, so that the treadle or axis thereof may rest thereupon without liability of dropping as is evident.

The loop J may be covered with felt, rubber or other material for preventing rattling of the stand thereon.

Having thus described my invention, what

I claim as new, and desire to secure by Letters Patent, is—

1. A bicycle lock consisting of a standard with a stem having a bifurcated end adapted to embrace the axle of the bicycle treadle, and forming a bow for a lock, and a horn in contact with the end of said treadle, said parts being combined substantially as described.

2. A carrier for a bicycle lock consisting of hangers with loops to receive the base of said lock, and a grooved block to be embraced by the shackle of said lock, substantially as described.

3. A bicycle lock consisting of a standard with a base, an adjustable stem having a bifurcated notched upper end and a lock for which said bifurcated end forms the bow or staple, said parts being combined substantially as described.

WILLIAM H. HART, JR.

Witnesses:
JOHN A. WIEDERSHEIM,
A. P. JENNINGS.